US007505241B2

(12) United States Patent
McLoughlin et al.

(10) Patent No.: US 7,505,241 B2
(45) Date of Patent: Mar. 17, 2009

(54) TRANSIENT VOLTAGE SURGE SUPPRESSION DEVICE

(75) Inventors: Neil McLoughlin, County Louth (IE); Michael O'Donovan, Dundalk (IE); Thomas Novak, Charleston, IL (US); Nathan Siegwald, Champaign, IL (US); Brian Walaszczyk, Homer Glen, IL (US); John Kennedy, Tuscola, IL (US); John Foster, Palm Bay, FL (US)

(73) Assignee: Littelfuse Ireland Limited, County Louth (IE)

( * ) Notice: Subject to any disclaimer, the term of this patent is extended or adjusted under 35 U.S.C. 154(b) by 0 days.

(21) Appl. No.: 11/691,995

(22) Filed: Mar. 27, 2007

(65) Prior Publication Data

US 2007/0285865 A1 Dec. 13, 2007

Related U.S. Application Data

(60) Provisional application No. 60/743,864, filed on Mar. 28, 2006.

(51) Int. Cl.
*H02H 1/00* (2006.01)

(52) U.S. Cl. ...................... 361/124; 361/93.8; 361/117; 361/118; 361/126; 361/127

(58) Field of Classification Search ......... 361/103–106, 361/56, 91.1, 111, 116–118, 124–127, 93.8
See application file for complete search history.

(56) References Cited

U.S. PATENT DOCUMENTS 4,169,271 A * 9/1979 Saitoh ........................ 257/529
4,441,093 A * 4/1984 Okazaki ..................... 337/404
4,727,348 A * 2/1988 Okazaki ..................... 337/403
4,939,498 A 7/1990 Yamada et al.
4,975,674 A * 12/1990 Sumiyoshi et al. ............ 338/21
5,510,942 A * 4/1996 Bock et al. ..................... 361/16
6,430,017 B1 * 8/2002 Finlay et al. ................ 361/104

(Continued)

FOREIGN PATENT DOCUMENTS

EP 0423368 A1 1/1990

(Continued)

*Primary Examiner*—Stephen W Jackson
*Assistant Examiner*—Terrence R Willoughby
(74) *Attorney, Agent, or Firm*—Bell, Boyd & Lloyd LLP

(57) ABSTRACT

An integrated fuse device (1) includes a varistor stack (11), a thermal fuse (12), and a current fuse (13) within an enclosure (2) having device terminals (3). The varistor stack (11) is connected to the thermal fuse (12) by a Cu terminal (20) and is connected to the device terminal (3) by steel terminal (10) of smaller cross-sectional area. Being of Cu material and having a greater cross-sectional area, the terminal (20) connected to the thermal fuse (12) has greater thermal conductivity than the steel terminal (10) to the end cap (3). The thermal fuse (12) comprises a plurality of links having a melting point to melt with sustained overvoltage, the links having a diameter in the range of about 2 mm to about 3 mm. The links pass through an elastomer plug (15), which exerts physical pressure on them to assist with opening during sustained overvoltage. Hot melt (18) around solder (17) of the thermal fuse limits heat conduction to back-fill sand.

22 Claims, 8 Drawing Sheets

U.S. PATENT DOCUMENTS

| | | | | |
|---|---|---|---|---|
| 6,535,369 | B1 | 3/2003 | Redding et al. | |
| 6,636,404 | B1 | 10/2003 | Whitney et al. | |
| 6,734,781 | B1 * | 5/2004 | Nagashima | 337/297 |
| 6,876,533 | B1 | 4/2005 | Ryan | |
| 7,224,255 | B2 * | 5/2007 | Uehara et al. | 337/297 |
| 2006/0267721 | A1 | 11/2006 | Graf et al. | |
| 2006/0267722 | A1 | 11/2006 | Graf et al. | |
| 2006/0268645 | A1 | 11/2006 | Graf et al. | |
| 2007/0019351 | A1 | 1/2007 | Whitney et al. | |

FOREIGN PATENT DOCUMENTS

| | | | |
|---|---|---|---|
| FR | 2478369 | | 9/1981 |
| JP | 02184016 | | 10/1989 |
| JP | 2001313202 | | 9/2001 |
| WO | WO9321678 | A1 | 10/1993 |
| WO | PCT/IE2007/000041 | | 3/2007 |

* cited by examiner

TRANSIENT VOLTAGE SURGE SUPPRESSION DEVICE

PRIORITY

This application claims priority to and the benefit of U.S. Provisional Application No. 60/743,864, filed Mar. 28, 2006, entitled TRANSIENT VOLTAGE SURGE SUPPRESSION.

BACKGROUND

The device and techniques disclosed herein relate generally to transient voltage surge suppression.

At present, in industrial type applications, such protection is often provided by a power distribution panel having a suppression module included inside. This suppression module typically consists of metal oxide varistors ("MOV"), which provide the surge suppression function. However under certain fault conditions the coating on the MOVs can burn and/or the MOV may rupture causing fragments to be expulsed. To safeguard against these events a typical suppression module will contain some form of thermal disconnect component and special fusing components to open prior to the MOV rupturing. Additional electronics are also included to indicate whether either the thermal disconnect or the fusing has operated.

At present it is known to assemble the discrete components either on a printed circuit board or by means of some mechanical joining method, (e.g. attached individually or to a busbar) and then to enclose the assembly with a suitable enclosure which would prevent expulsion of fragments of a component should a catastrophic failure occur under fault conditions. In addition, the enclosure must also contain a fire should a component combust under fault conditions. These requirements require relatively expensive enclosures which in some cases may be filled with a flame/arc damping material such as sand. It has been known for the enclosure to be a significant portion of the total cost of the total module. Since the main components such as the MOV, fuse and thermal disconnect are all individual components special attention needs to be taken to ensure that the combination of the components will operate as required.

The exemplary embodiments of present disclosure address at least the problems discussed above.

SUMMARY

According to at least one of the embodiments disclosed herein, there is provided an integrated fuse device that includes a varistor, a thermal fuse, and a current fuse within an enclosure having device terminals, wherein the varistor is connected to the thermal fuse by a link having a higher thermal conductivity than a link between the varistor and the device terminal.

In one embodiment, the link to the thermal fuse is of copper, and the link to the device terminal is of steel.

In another embodiment, the link to the device terminal comprises at least two plates.

In a further embodiment, the link to the device terminal has a cross-sectional area of less than 2 $mm^2$.

In one embodiment, the link to the thermal fuse has a cross-sectional area of at least 10 $mm^2$.

In another embodiment, the thermal fuse comprises a plurality of thermal elements.

In a further embodiment, the thermal elements have a diameter in the range of 2 mm to 3 mm.

In one embodiment, the thermal elements are of solder composition.

In another embodiment, the thermal fuse is configured to also act as an over-current fuse in specified conditions.

In a further embodiment, the thermal fuse comprises a thermal insulator coating to limit heat flow to the environment such as back-filled sand.

In one embodiment, the thermal fuse passes through a body which exerts inward pressure around the thermal fuse.

In another embodiment, the body is of deformable material.

In a further embodiment, the thermal fuse comprises at least one thermal element of round cross-section extending through the body.

In one embodiment, the thermal fuse comprises two stages, a first stage with an encapsulant around a thermal element and a second stage with a thermal element parsing through a deformable body which exerts inward pressure on the thermal element.

In another embodiment, the thermal fuse comprises a shape memory metal having at least one bend along its length.

In a further embodiment, the varistor comprises a combined electrode and terminal for electrical and mechanical connection.

In one embodiment, the combined electrode and terminal is of fired silver material.

In another embodiment, a terminal for the varistor includes holes arranged so that the terminal also acts as a current fuse.

According to at least another one of the embodiments disclosed herein, there is provided an integrated fuse device that includes: an enclosure; a varistor located within the enclosure; a thermal fuse located within the enclosure and connected to the varistor; and a current fuse located within the enclosure and connected to the thermal fuse.

In one embodiment, the thermal fuse includes a coating that minimizes heat sinking, and wherein the thermal fuse is a first thermal fuse and which includes a second thermal fuse.

According to at least a further one of the embodiments disclosed herein, there is provided an integrated circuit protection device that includes: an enclosure; an overvoltage protection device located within the enclosure; an overcurrent protection device located within the enclosure; and an overtemperature protection device electrically connecting the overvoltage protection device to the overtemperature protection device.

In one embodiment, at least one of: a first link between the overvoltage protection device and the overtemperature protection device is made of copper, a second link between the overvoltage protection device and a device terminal is made of steel, and the first link has a greater cross-sectional area than that of the second link.

It is accordingly an advantage of the present disclosure to provide a multi-faceted circuit protection device in a single package.

Additional features and advantages are described herein, and will be apparent from, the following Detailed Description and the figures.

DETAILED DESCRIPTION

Figure 1A:
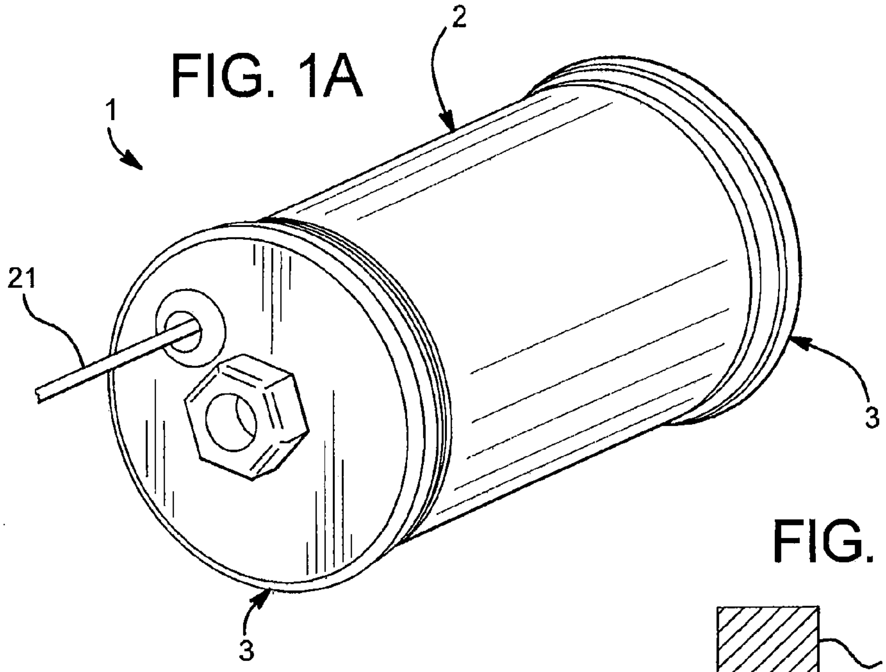
FIG. 1A is an outside perspective view of a protection device of the invention.

Referring now to the drawings and in particular to FIGS. 1A, 1B, 2A, 2B, 3 and 4, a protection device 1 includes a fiberglass tube 2 and crimped copper ("Cu") end caps 3 in one embodiment. Device 1 can be used for example in the transient voltage surge suppression ("TVSS") field. A TVSS module is typically found in a power distribution panel within a facility such as a factory or office block. The purpose of the TVSS module is to suppress voltage transients which can occur on the power line due to events such as lightning, and so protect electronic equipment connected to the power line from damage.

Varistor terminals 10 are connected to an end cap 3. The terminals 10 are in one embodiment made of 0.4 millimeter ("mm") steel, are 4 mm wide, and are 20 mm long. The terminals 10 extend from a stack 11 of three varistors in parallel, described below in more detail with reference to FIG. 3.

A thermal fuse includes links 12 of solder material, solder 17 securing the links 12 to Cu varistor terminals 20, and hot melt adhesive 18 over the solder 17. The thermal fuse links 12 can be 12 mm long and have a round cross-section of about 2 mm to about 3 mm diameter. The Cu terminals 20 in one embodiment have an exposed length of 5 mm, made of 0.8 mm Cu plate and are 20 mm wide. The links 12 can be reflowed to the Cu terminal 20 by the (lower melting temperature) solder paste 17, covered by the coating of hot melt adhesive 18, covering this connection. The links 12 may alternatively be soldered directly to the Cu terminals 20. The thermal fuse link 12 connection to the Cu terminal 20 is coated with hot melt adhesive 18 to give a level of thermal isolation from surrounding filler material. The purpose of the coating 18 is to minimize heat lost to the filler material. This material in one embodiment is deposited such that at a minimum the connection points of the links 12 and the solder 17 on the copper terminal 20 are covered. In this embodiment, the coating material 18 is a hot melt adhesive of a polyamide composition and the filler material is sand.

Figure 2A:
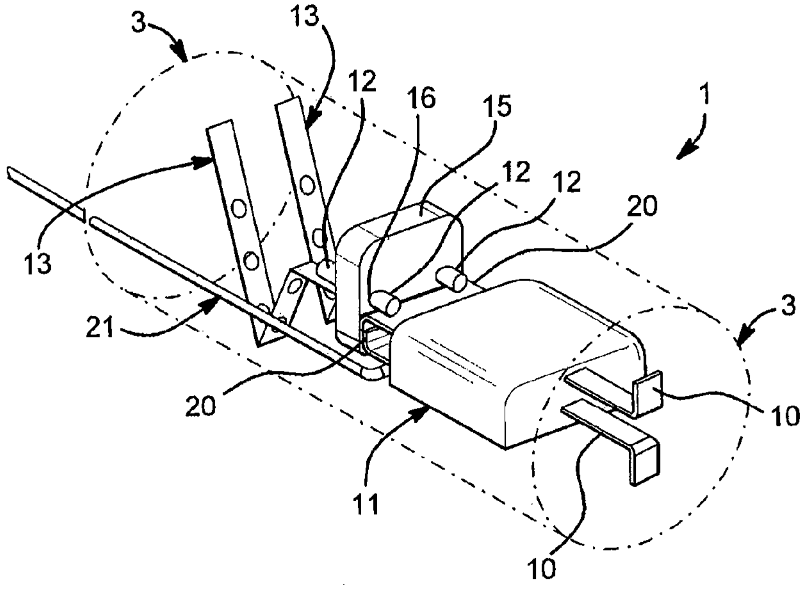
FIG. 2A is a perspective view and two diagrammatic sections showing the internal components of the device.
Figure 2B:
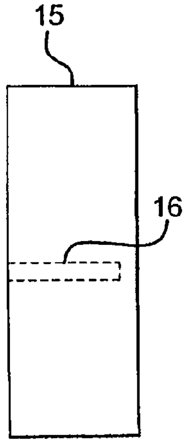
FIG. 2B is a side view of an elastomer plug having a hole that does not extend all the way through the plug.

The thermal fuse links 12 pass through an elastomer plug 15 in the illustrated embodiment. Elastomer plug 15 in one embodiment is made of silicone rubber material and defines a plurality of holes 16. The diameters of holes 16 in the plug 15, when relaxed, are less than that of the links 12. Holes 16 therefore exert pressure on the links 12, especially when they soften. In one embodiment the hole 16 dimensions are of 0.8 mm diameter. It is also of benefit that, as illustrated in FIG. 2B, the holes in the plug do not extend all the way through plug 15 initially. This feature increases the pressure on the thermal fuse links 12 at the point where they are forced through the remaining portion of the plug 15. In one embodiment, this remaining portion of the plug material is 0.4 mm in depth. The plug 15 has an overall dimension of 16.3 mm by 14 mm (length by width) and 4.4 mm thick in one embodiment. The corners can have a radius of 4 mm.

An indicator lead 21 extends from a Cu terminal 20 out through one end cap 3. When both fuse elements, current fuse element 13 and thermal fuse 12 are intact, the supply voltage will appear on the indicator lead. If either fuse element is opened, the voltage on the indicator lead is removed. This on/off feature can be used for the purposes of alarm indication.

Current fuse 13 in the illustrated embodiment includes a pair of perforated lengths of Cu. The metal may alternatively be Ag of alloys of Cu and Ag. The holes can have a 2 mm diameter. The length and hole dimensions of the Cu lengths are chosen to provide a desired device rating.

Tube 2 can be back-filled with sand, which surrounds all of the components shown in FIG. 2.

Figure 3:
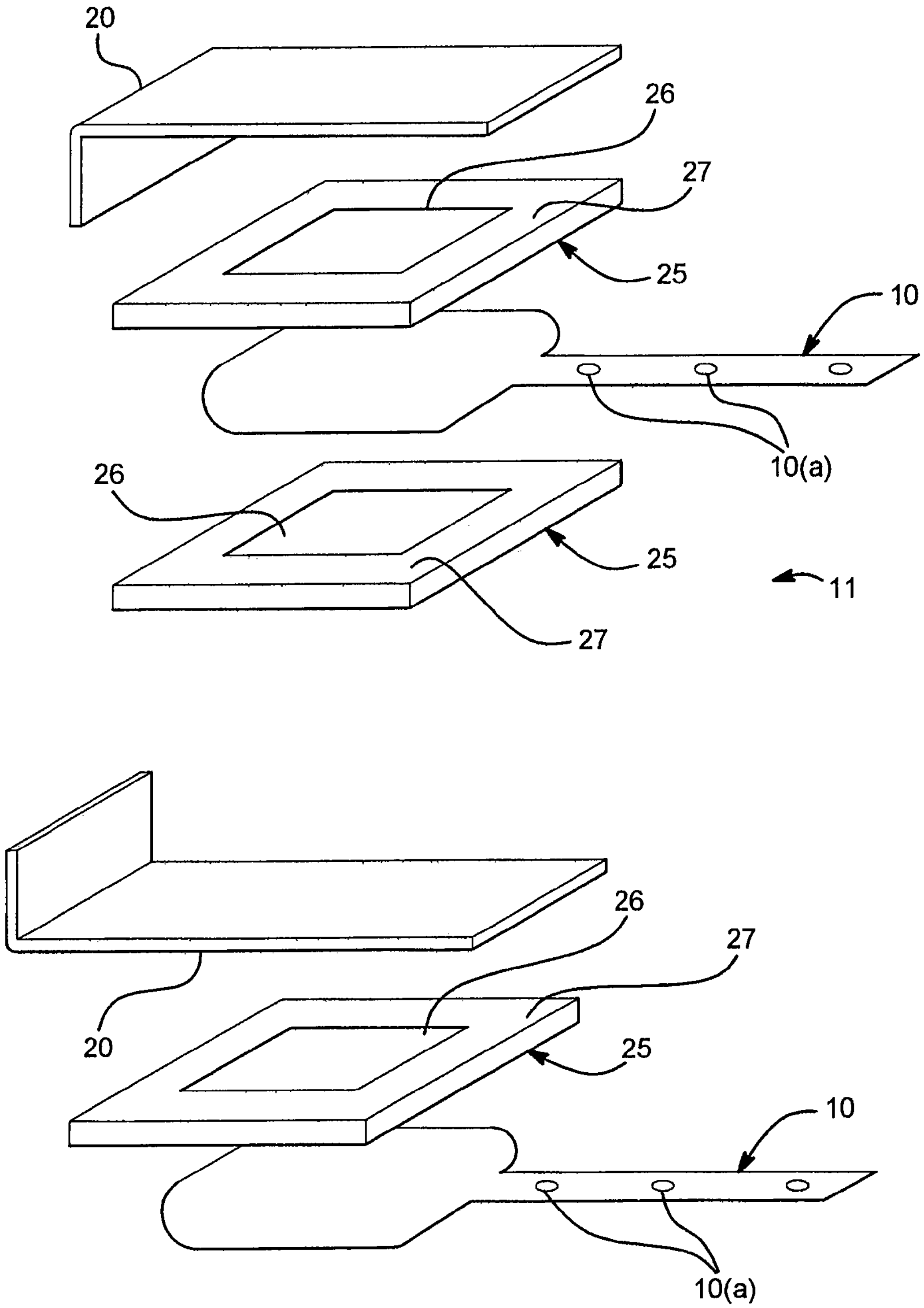
FIG. 3 is an exploded perspective view of a varistor stack of the device.

Referring particularly to FIG. 3, varistor stack 11 in one embodiment includes three metal oxide varistor ("MOV") elements 25, each element 25 having an electrode 26 and a ring of passivation 27. Each electrode 26 extends under the passivation 27 but not to the edge of the MOV elements 25. The Cu terminals 20 can be identical. The end terminals 10 include a thin (e.g., 0.4 mm) steel plate, which is sandwiched between MOV elements 25. The above-described structure results in a large difference in thermal conduction paths, wherein terminals 10 are relatively thin and Cu terminals 20 have a much greater cross-sectional area. Also, the thermal conductivity of steel terminals 10 is about 16 W/(M-K) and that of Cu terminal 20 is about 400 W/(M-K). The differences in physical cross-sectional area (10:1) and in thermal conductivity (25:1) together give a thermal path to the thermal fuse 12 via terminal 12, which is much greater than that to the end cap 3 via terminal 10.

The metal oxide varistor stack 11 suppresses transient (very short term) overvoltages, which can be on the order of micro-seconds. In that time-frame the varistor stack 11 absorbs and dissipates substantial electrical energy. However, the varistors are not designed to suppress a sustained overvoltage, e.g., a situation in which the voltage rises from 120VAC to 240VAC for a significant period of time. For a MOV, a significant period of time may be of the order of seconds. Depending on the extent and time of the sustained overvoltage and the short-circuit current available, the MOV 11 may overheat and become a fire hazard.

A sustained overvoltage condition can occur during the installation of any electrical equipment, for example due to a connection to the wrong supply voltage. However sustained overvoltages can occur even with correctly installed equipment. In industrial installations the supply voltage can be supplied by one, two or three phase systems. A common type of incident leading to a sustained overvoltage is the impact of a "loss of neutral conductor" in a 2 or 3 phase system. If the electrical loads on the different phases are unbalanced and the neutral connection is lost then equipment normally operating at 120VAC can suddenly be supplied a voltage between 120VAC and 240VAC. Such a condition may not trip a circuit breaker, allowing the condition to last for a prolonged time. Other conditions can also lead to sustained overvoltages. Surge Suppression Devices ("SPD's") are accordingly subjected to sustained overvoltage conditions with varying short-circuit conditions to simulate conditions which can occur in the field.

Figure 4:
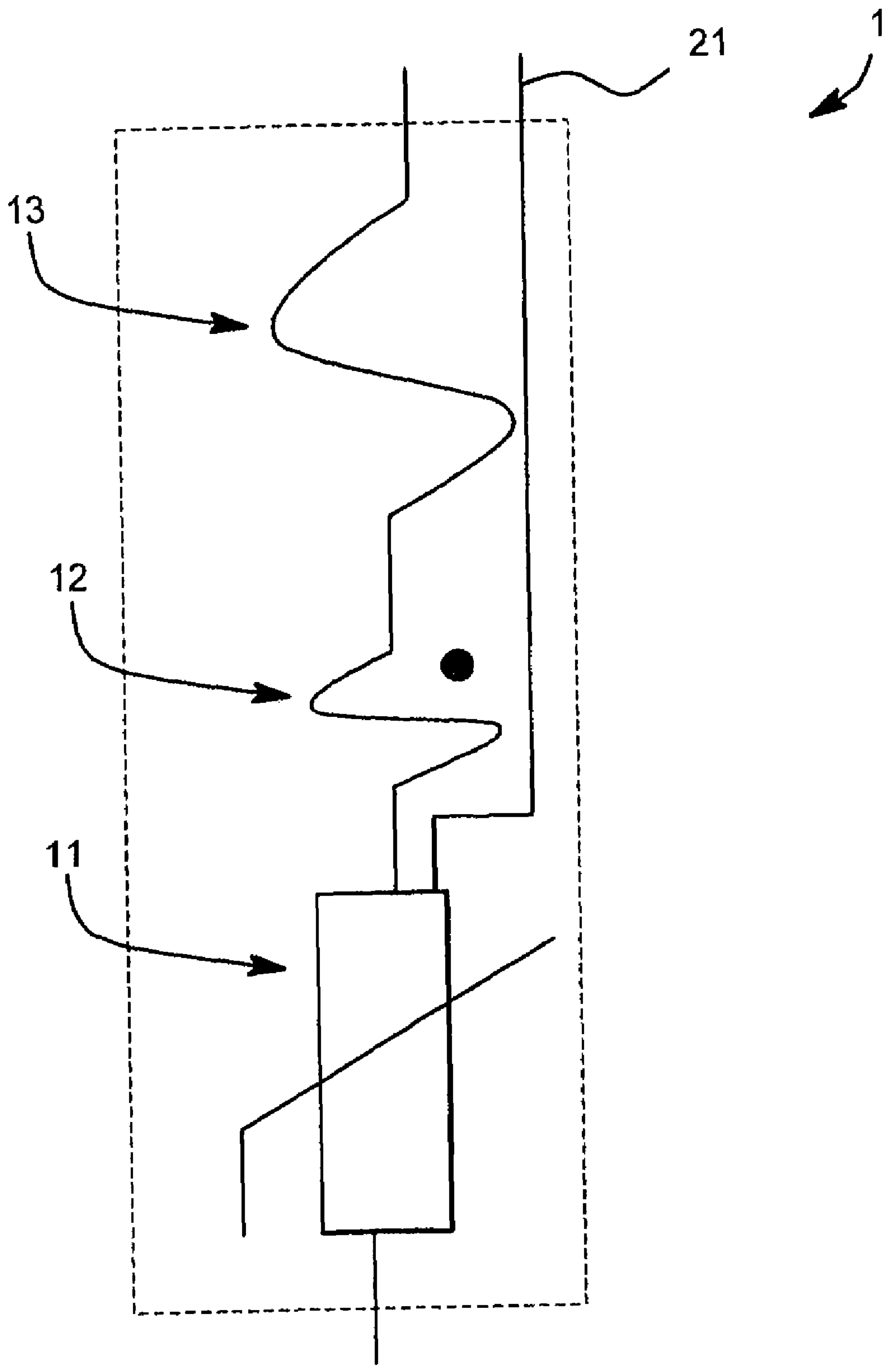
FIG. 4 is a device schematic diagram.

FIG. 4 shows that device 1 provides three types of circuit protection namely: (i) varistor stack 11 for transient surges; (ii) thermal fuse 12 for sustained overvoltage and short circuit (high current) conditions, e.g., to protect varistor stack 11; and (iii) current fuse 13 for very high currents of the order of kAmps.

Figure 5A:
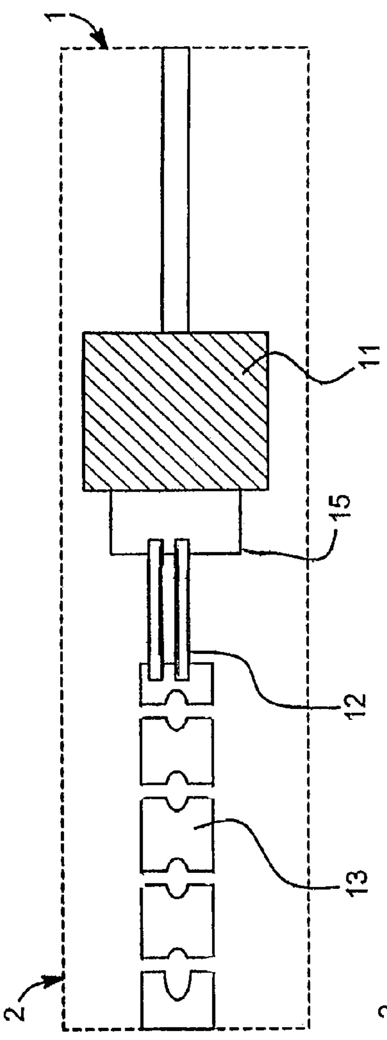
FIGS. 5A to 5C are side views of one embodiment of the device of the present disclosure showing its operation.
Figure 5B:
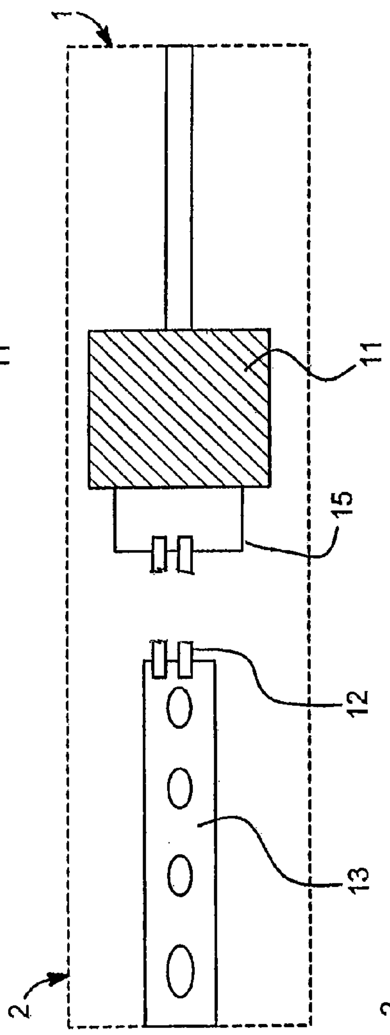
Figure 5C:
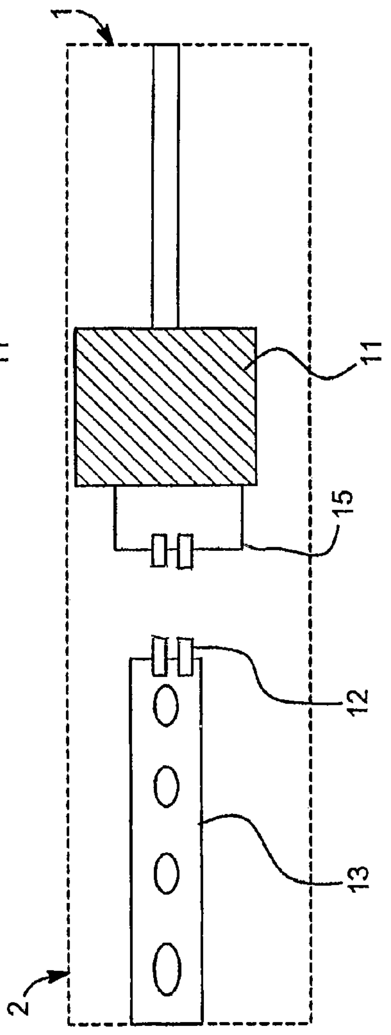

Referring to FIGS. 5A to 5C (illustrations shown are based on actual x-rays submitted in original filing taken of three test cases), three fault test results are illustrated. FIG. 5A illustrates a 10kAmp short circuit and abnormal overvoltage test result in which thermal fuse links 12 are intact and current fuse 13 open. FIG. 5B illustrates a 1kAmp short circuit and abnormal voltage test result in which current fuse 13 remains intact and thermal fuse links 12 open. FIG. 5C illustrates a 500 Amp short circuit and an abnormal overvoltage test result in which current fuse 13 remains intact and thermal fuse links 12 open. The tube enclosures 2 as seen are able to withstand the MOVs and the fuse fragmenting under fault conditions.

Figure 6:
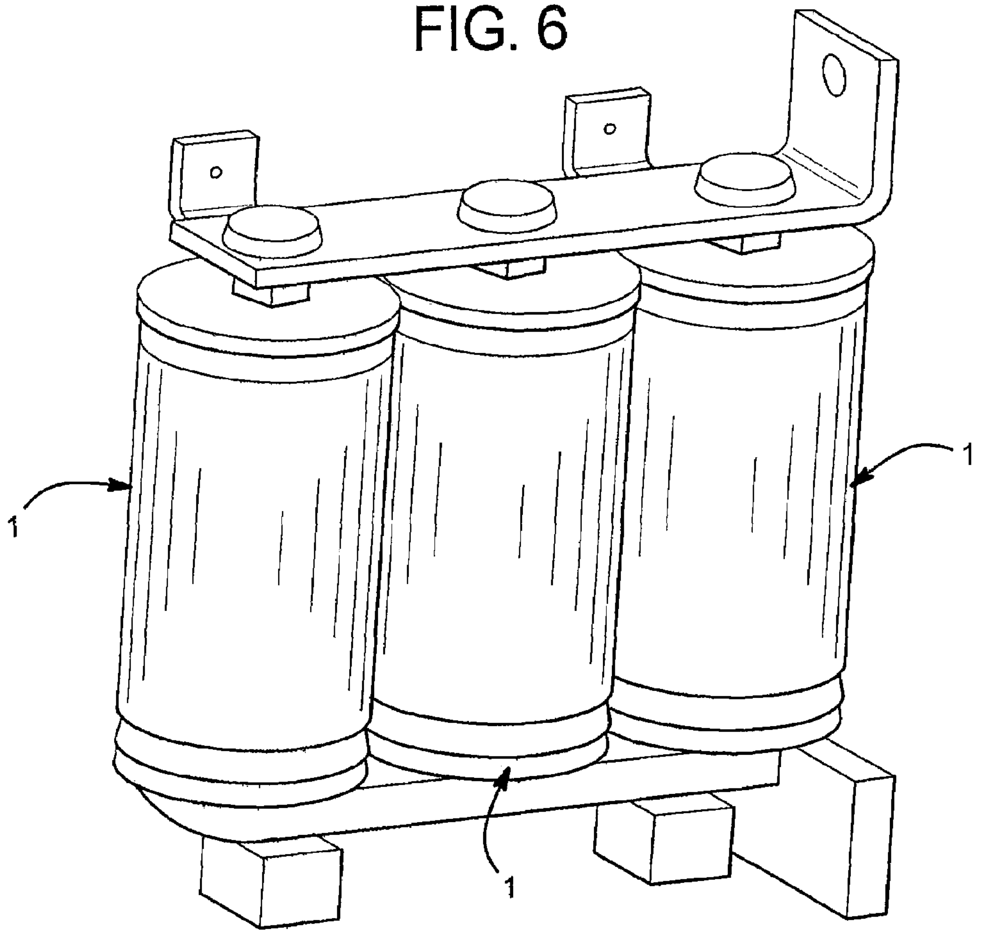
FIG. 6 is a perspective view of a bank of three of the devices in a an application arrangement.

FIG. 6 illustrates a bank of three devices 1.

Protection device 1 integrates the basic functions of a TVSS module into a single, industry-standard package. The suppression component, thermal disconnect, and suppression fuse are contained within an industrial fuse body in one embodiment.

Figure 1B:
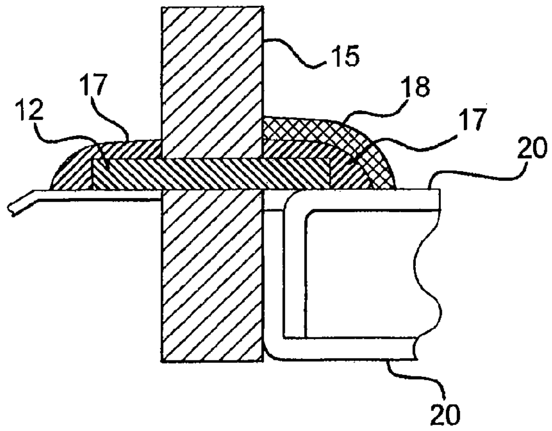
FIG. 1B is a cross-section view of an elastomer plug in relation to a terminal of the device of FIG. 1.

Thermal disconnect is effected by the make-up of thermal fuse links 12, solder 17 securing the links 12 to Cu varistor terminals 20, and hot melt adhesive 18 as seen in FIG. 1B. Under the defined fault conditions, the MOV stack 11 generates heat. This heat melts the solder links 12 and 17 of the thermal fuse. However the back-filled sand mentioned above acts as a heat sink. One end of the MOV stack 11 is connected to the metal end cap 3 of the device body, which also acts as a heat sink. The hot melt adhesive 18 minimizes the heat loss at the thermal fuse 12 due to the sand. Also, because of the high heat conductivity of Cu terminals 20, heat transfers more quickly to the thermal fuse links 12, solder 17 and adhesive 18 of the thermal fuse.

The current fuse 13 is in one embodiment is configured to open when subjected to currents of typically greater than 1,000 Amps under the specified fault conditions. However, a technical conflict arises due to the need for the complete device 1 to open at test points of 100 Amps and 500 Amps, and for the current fuse 13 to be able to sustain up to a 40,000 Amp surge test (8/20 μ-sec). Reducing the dimensions of the current fuse 13 would enable it to open at the 100/500 Amp current levels, but would render it insufficient to handle the 40kA surge test without opening.

The thermal fuse 12 of device 1 opens typically between 100 to 1000 Amp. Under the 100 Amp to 1000 Amp test, however, the MOV 11 stack fails rapidly and will not generate enough heat to melt the thermal fuse. The thermal fuse 12 therefore needs to generate its own heat to cause it to open under these test conditions. There are conflicting requirements on the thermal fuse 12: (a) it must not fail under the 40kA surge test, (b) it must open under the 0.5 Amp to 5 Amp limited current test in a time of less than 7 hours, and (c) it must self-open under the 100 Amp to 1000 Amp test condition. These test conditions are specified by industry standards.

With device 1, a combination of thermal fuse 12 link cross-sectional area, alloy composition, metal composition of the MOV 11 terminals, and elastomer plug 15 accommodates all of the above test requirements. The elastomer plug 15 aids the separation of the thermal fuse links 12. Each hole 16 in the plug 15 has a diameter less than that of the thermal fuse 12 link. In this case, when the thermal fuse links 12 heat and soften, plug 15 applies pressure to help separate the thermal fuse links. In one embodiment the thermal fuse link alloy composition is a low-melt solder alloy Bismuth/Lead/Cadmium in the ratio 42.5%/37.7%/8.5%.

Figure 7:
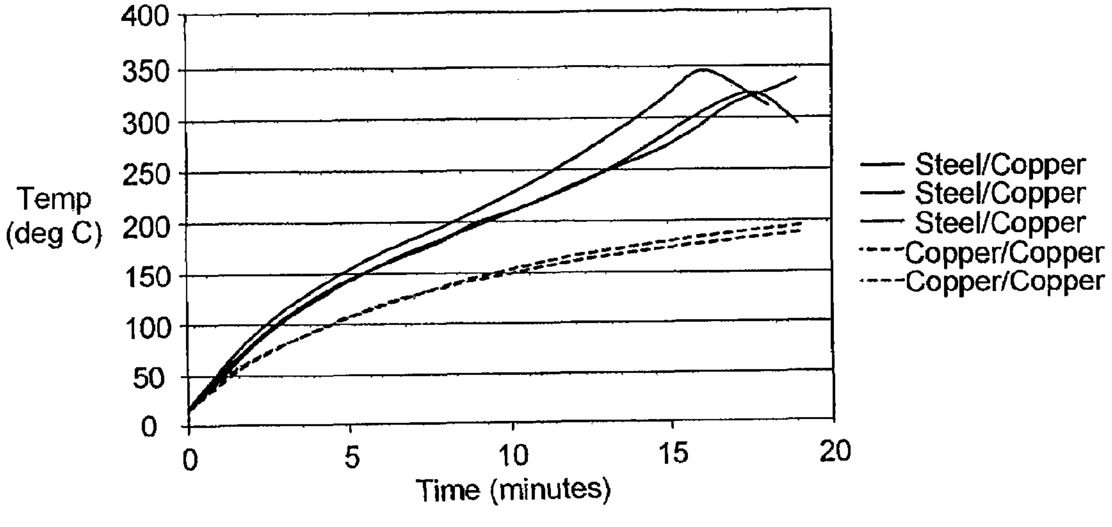
FIG. 7 is a set of temperature vs. time plots for multiple ones of the devices.

Referring to FIG. 7, the temperature rise impact of different metal combinations used in the MOV stack 11 is shown. The purpose is to attain the maximum temperature rise on the Cu terminals 20, connected to the thermal fuse 12. The MOV stack 11 is the heat source under this specific fault condition. FIG. 7 demonstrates that the use of steel terminals 10 on one end of the stack 11 helps to increase the rate of temperature rise on the Cu terminals 20.

Table 1 demonstrates the ability of the selected components to sustain 40kA (8/20 usec) transient pulse condition without issue,

TABLE 1

FBTmov186 (V320s) 40 kA 8/20 μs test
Energising voltage = 220 VAC 50 Hz

| | Test Current | 8/20 μs waveform measurements | | Vn Pre-test | Vn Post test | % Change | |
|---|---|---|---|---|---|---|---|
| | kA | t1 | t2 | V | V | % | Result |
| 29 | 39.6 | 7.85 | 20.6 | 512.4 | 511.4 | −0.2% | Ok |
| 30 | 40.2 | 7.80 | 20.6 | 539.7 | 529.3 | −1.9% | Ok |
| 31 | 39.8 | 7.83 | 20.4 | 497.0 | 499.3 | 0.5% | Ok |

Table 2 sets forth test results which demonstrate that the selected components meet all the current (design critical) specific fault test conditions.

TABLE 2

| Test | 320 V Quantity Design 183 | 150 V Quantity Design 182 | Tested | Passed | Failed | % Pass |
|---|---|---|---|---|---|---|
| Limited Current | | | | | | |
| 0.5 A | 5 | 5 | 10 | 10 | 0 | 100% |
| 2.5 A | 5 | 5 | 10 | 10 | 0 | 100% |
| 5 A | 5 | 5 | 10 | 10 | 0 | 100% |
| 10 A | 5 | 5 | 10 | 10 | 0 | 100% |
| Overload | | | | | | |
| 100 A | 5 | n/a | 5 | 5 | 0 | 100% |
| 500 A | 5 | n/a | 5 | 5 | 0 | 100% |
| 1000 A | 5 | n/a | 5 | 5 | 0 | 100% |
| 2000 A | 5 | n/a | 5 | 5 | 0 | 100% |

TABLE 2-continued

| Test | 320 V Quantity Design 183 | 150 V Quantity Design 182 | Tested | Passed | Failed | % Pass |
|---|---|---|---|---|---|---|
| Pulse Test | | | | | | |
| 10 kA (repeated) | 5 | 5 | 10 | 10 | 0 | 100% |
| 40 kA (1 shot) | 5 | 5 | 10 | 10 | 0 | 100% |
| Totals | 50 | 30 | 80 | 80 | 0 | 100.0% |

The above illustrates that the device 1 operates under the specified test conditions covering the range 0.5 A up to 2kA, and in addition the peak pulse condition of 40kA. In addition, further testing has been carried out to demonstrate that the unit operates as designed under short-circuit test conditions including 5kA, 10kA and 200kA.

Device 1 is advantageous in one respect because it incorporates all the above-described components into a single body. Since industrial fuses are required to be constructed so as to provide containment from rupture and fire under fuse fault conditions, it is advantageous to include the additional components for surge suppression and thermal disconnect within a fuse body. This eliminates the need for a further enclosure by the end user. Although some enclosure will be used to suit the end application, that enclosure will be simplified.

While in the above illustrated embodiments, the current fuse element is attached to the thermal fuse and then to the MOV 11 stack, an alternative connection/arrangement can be provided. Since the MOV stack 11 has an electrode, which can be a fired silver material, a silver current fuse element can be formed as part of the MOV terminal and co-fired between 500-800° C. such that the MOV electrode is bonded to the MOV ceramic material and in addition is bonded to the silver current fuse/terminal. This eliminates the need for a soldering operation, which can cause a leakage current issue arising from the flux required during the soldering process.

Further alternatively, holes may be incorporated into the terminal 10 to act in place of or as an additional current fuse 13. An example of such holes is shown in FIG. 3 by holes 10(*a*). The configuration of the links and holes is chosen according to the required specification and whether the links are replacing the current fuse 13 or are complementary.

For very low limited current fault conditions, e.g., typically less than 0.5 Amp, in which the heat generated in the stack 11 does not greatly exceed the melt temperature of the thermal fuse links 12, the, e.g., silicone rubber of plug 15 can act as a heat sink and prevent solder links 12 from melting. The silicone rubber as described herein is useful in the 100 Amp to 1000 Amp fault region, accordingly, an alternative device described below is provided to address low current fault conditions.

Figure 8:
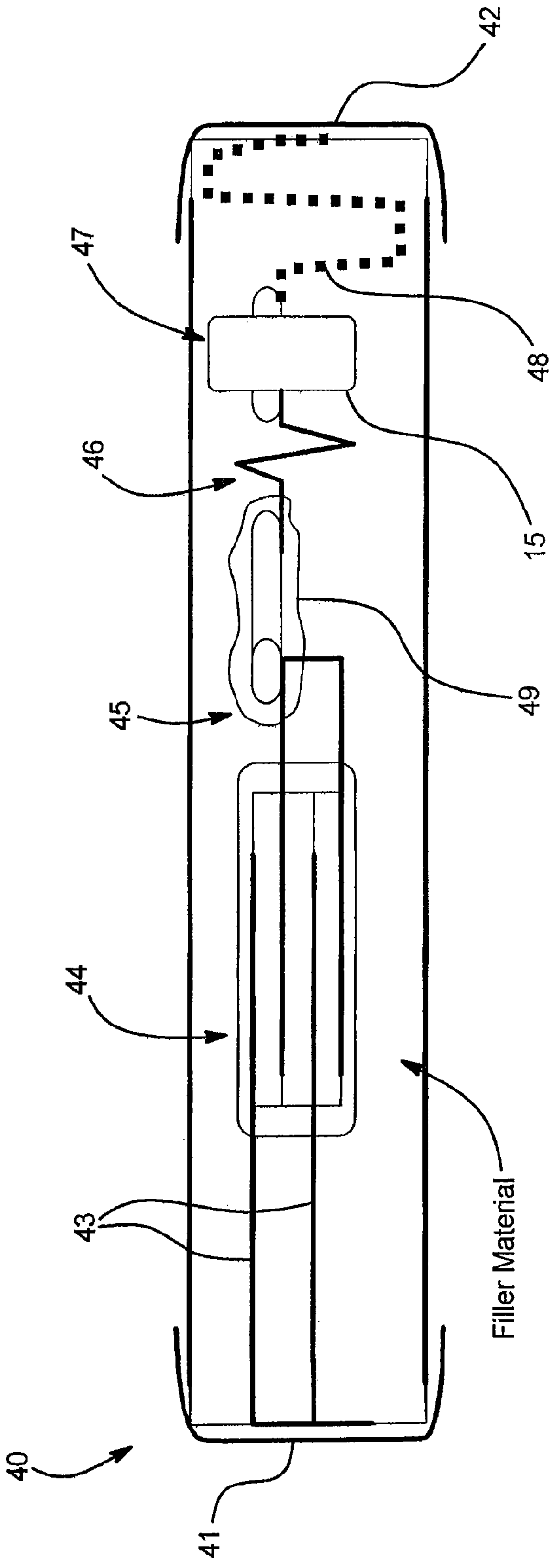
FIGS. 8 and 9 are side views illustrating alternative embodiments of the device of the present disclosure.

FIG. 8 illustrates an alternative protection device 40. Device 40 includes end caps 41 and 42, terminals 43 connected to a stack 44 of varistors, a first thermal fuse link 45, a bridge 46, a second thermal fuse link 47, and a current fuse 48. The first thermal fuse link 45 has a hot melt coating/encapsulation 49. The second thermal fuse link 47 has the elastomer device 15. Hot melt coating/encapsulation 49 ensures minimum heat sinking, making first thermal fuse link 45 and device 40 able to melt under low current fault conditions.

Figure 9:
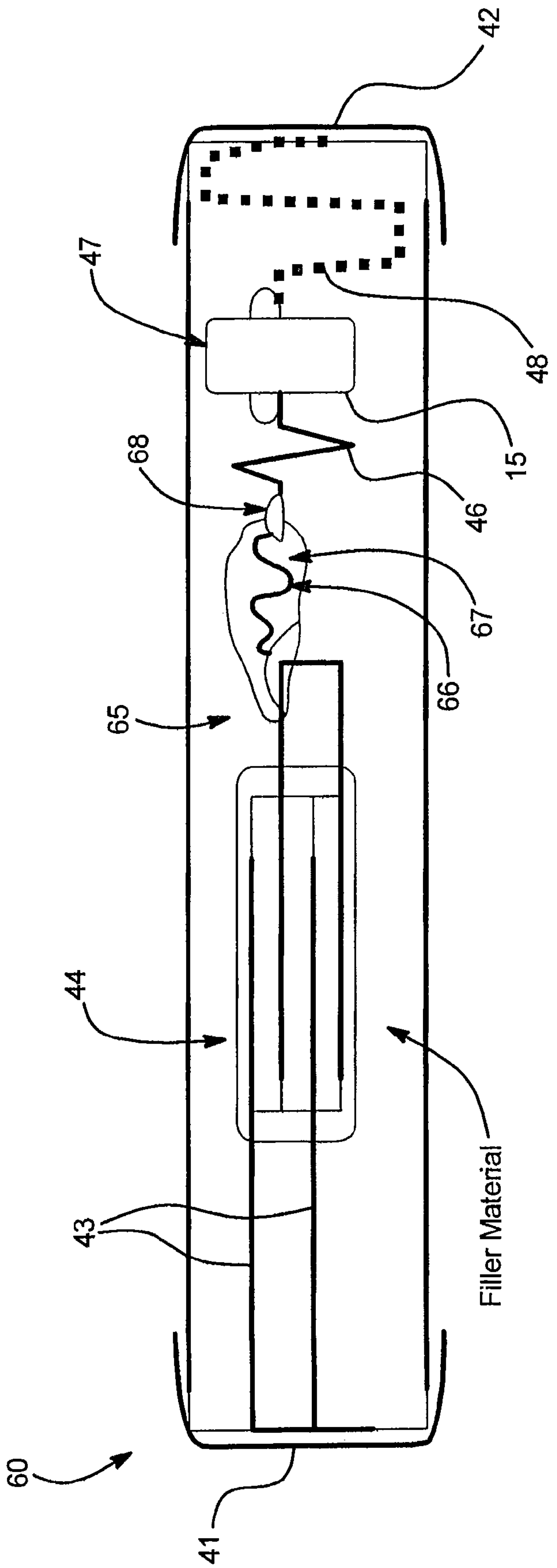

Referring to FIG. 9, a further alternative protection device 60 is illustrated and includes a first thermal fuse 65, which includes a shape memory metal alloy 66. Coating material 67 is structured so as to allow the shape memory metal 66 to contract. Solder or conductive epoxy connections 68 connect fuse 65 at both ends. Shape memory alloy, such as Nickel Titanium, has the ability to be deformed at room temperature and when heated will return to its original shape. In the illustrated application, alloy element 66 has an original form in one embodiment of a coil. Upon installation, coiled element 66 is deformed and stretched between the bridge 46 and the stack of varistors 44. The connection of element 66 to varistor stack 44 terminal and the bridge 46 is via the solder or conductive epoxy 68.

When heat is generated under fault conditions by the varistor stack the connection will melt or soften and the shape memory alloy will return to its original shape, in this case a coil, which will be shorter than the gap between the varistor stack 44 and the bridge 46. The coating material 67 is such that when heated it softens and therefore allows room for the shape memory alloy to move.

Figure 10:
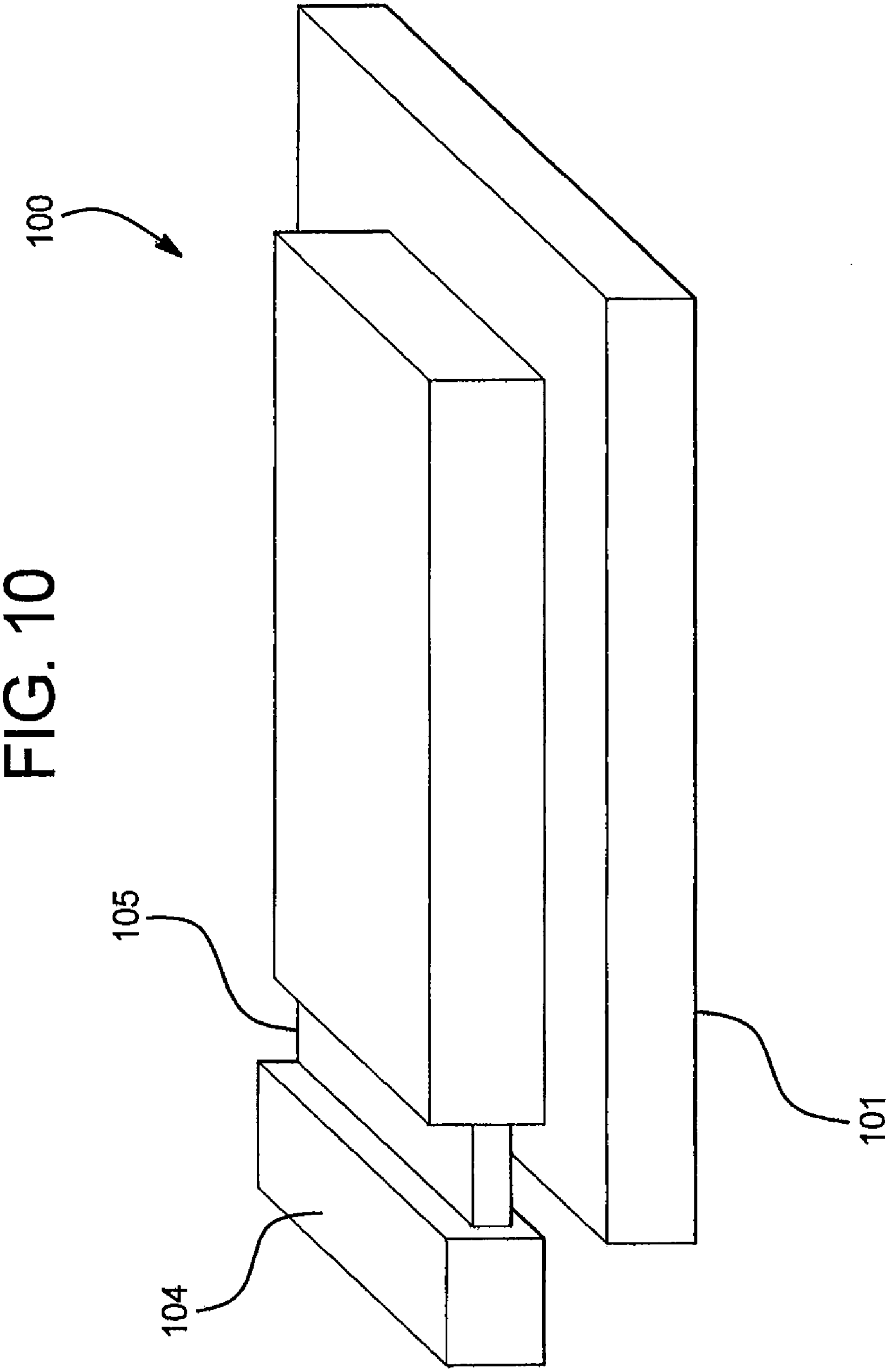
FIG. 10 is a perspective view of an alternative varistor stack.

Referring to FIG. 10, device 100 illustrates an alternative terminal configuration. A portion of the terminal 104 has a reduced thickness 105 at a place coinciding with the edge of a MOV element 101. The purpose of reduced thickness 105 is to avoid the terminal lying on the MOV element at the edge, which may promote an electrical arc across the edge of the MOV element 101 under high voltage surge conditions. In other embodiments the number of MOV elements in the stack may be different, such as two or only one instead of three. The specification of the MOV stack depends on the overall device specification.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An integrated fuse device comprising:

an enclosure;

a varistor located within the enclosure;

a thermal fuse located within the enclosure and connected to the varistor; and a current fuse located within the enclosure and operable with the varistor and thermal fuse wherein the varistor is connected to the thermal fuse by a first link having a higher thermal conductivity than a second link between the varistor and a device terminal.

2. The integrated fuse device of claim 1, wherein the thermal fuse includes a coating that minimizes heat sinking.

3. The integrated fuse device of claim 1, further comprising at least one of: the first link is made of copper, the second link is made of steel, and the first link has a greater cross-sectional area than that of the second link.

4. The integrated fuse device of claim1, wherein the second link includes at least one of: (i) at least two metal strips; and (ii) a cross-sectional area of less than 2 $mm^2$.

5. The integrated fuse device of claim 1, wherein the first link has a cross-sectional area of at least 10 $mm^2$.

6. The integrated fuse device of claim 1, wherein the thermal fuse includes a plurality of thermal elements.

7. The integrated fuse device of claim 6, wherein the thermal elements include at least one characteristic selected from the group consisting of: (i) a diameter in the range of about 2 mm to about 3 mm and (ii) being made of a solder composition.

8. The integrated fuse device of claim 1, wherein the thermal fuse has at least one characteristic selected from the group consisting of: (i) being configured to also act as an over-current fuse; (ii) including at least one link that opens upon a sustained overvoltage; (iii) including at least one length of a conductor defining apertures; and (iv) being bent between its ends to extend its length.

9. The integrated fuse device of claim 1, which includes a thermal insulator to limit heat flow to the environment.

10. The integrated fuse device of claim 1, wherein the thermal fuse passes through a body which exerts pressure around the thermal fuse.

11. The integrated fuse device of claim 1, wherein the thermal fuse includes two stages, a first stage with an encapsulant around a thermal element and a second stage with a thermal element passing through a deformable body which exerts inward pressure on the thermal element.

12. The integrated fuse device of claim 1, wherein the thermal fuse includes a shape memory metal having at least one bend along its length.

13. The integrated fuse device of claim 1, wherein the varistor includes an electrode which operates for both electrical and mechanical connection.

14. The intergrated fuse device of claim 13, wherein the combined electrode and terminal is of fired silver material.

15. The integrated fuse device of claim 1, wherein a terminal for the varistor includes holes arranged so that the terminal also operates as a current fuse.

16. The integrated fuse device of claim 1, wherein the varistor electrodes have recesses.

17. The integrated fuse device of claim 1, wherein the current fuse extends from the thermal fuse to a device terminal.

18. An integrated fuse device comprising:

an enclosure;

a varistor located within the enclosure;

a thermal fuse located within the enclosure and connected to the varistor; and a current fuse located within the enclosure and connected to the thermal fuse wherein the thermal fuse includes two stages, a first stage with an encapsulant around a thermal element and a second stage with a thermal element passing through a deformable body which exerts inward pressure on the thermal element.

19. The integrated fuse device of claim 1, wherein the thermal fuse includes a coating that minimizes heat sinking.

20. The integrated fuse device of claim 19, wherein the thermal fuse is a first thermal fuse and which includes a second thermal fuse in series with the first thermal fuse.

21. An integrated circuit protection device comprising:

an enclosure;

an overvoltage protection device located within the enclosure;

an overcurrent protection device located within the enclosure; and an overtemperature protection device electrically connecting the overvoltage protection device to the overtemperature protection device and wherein at least one of: a first link between the overvoltage protection device and the overtemperature protection device is made of copper, a second link between the overvoltage protection device and a device terminal is made of steel, and the first link has a greater cross-sectional area than that of the second link.

22. The integrated circuit protection device of claim 21, wherein the overcurrent protection extends from a thermal fuse to a device terminal.

* * * * *